Patented May 3, 1938

2,116,454

UNITED STATES PATENT OFFICE 2,116,454

HIGHLY ACTIVE PREPARATION OF ERGOT AND PROCESS FOR MAKING SAME

Marvin R. Thompson, Baltimore, Md.

No Drawing. Application August 16, 1934,
Serial No. 740,199

4 Claims. (Cl. 87—28)

The present invention provides a hitherto unknown component of ergot and process for making the same.

This component, henceforth called Ergostetrine, is a substance exhibiting alkaloidal properties, but differs greatly from all of the hitherto unknown alkaloids of ergot, in that its physiological, therapeutic or oxytocic activity develops with remarkable promptness when compared with any of the other hitherto known alkaloids or components of ergot.

The known therapeutically significant components of ergot are "Ergotoxine", "Ergotamine" and "Sensibamine". These components of ergot or alkaloids are possessed of oxytocic activity, but this activity manifests itself only in an erratic and much delayed manner following dosage by mouth. Even when administered subcutaneously or intramuscularly the uterine activity of these alkaloids or components of ergot develop very slowly and feebly compared to Ergostetrine, the subject of the present invention.

Briefly stated, the instant invention provides a hitherto unknown component of ergot, called Ergostetrine whose physiological, therapeutic or oxytocic activity develops with a marked degree of quickness when compared with other known alkaloids, and consists of the "residual alkaloid" as a single chemical entity which remains after the chemical removal of all of the other hitherto known alkaloidal substances.

Ergostetrine differs from all other hitherto known alkaloids or components of ergot in that it is considerably more soluble in water as the free base or its salts than the hitherto known alkaloids or their salts. Its most readily apparent and therapeutically all important difference lies in the fact that its oxytocic action develops with a marked degree of rapidity and intensity following either oral, or parenteral administration, as compared by actual test with any of the other hitherto known alkaloids or purified preparations of ergot.

The new component, Ergostetrine as such can be obtained as a dry powder, either from crude ergot or from crude ergot extracts in various ways and for illustrative purposes I hereinafter describe several preferred methods of making the same.

From crude ergot

In accordance with one procedure I mix 1 kilogram of finely powdered ergot, preferably defatted with benzine, with a sufficient quantity of an aqueous solution or mixture of any alkali, such as hydroxides, carbonates or bicarbonates of sodium, potassium, ammonium, lithium, strontium, calcium, magnesium, etc. to render it evenly and distinctly damp, and to impart a slightly but definitely alkaline reaction to the mixture. The dampened and alkaline drug is then exhaustively extracted with ethyl ether, benzol, acetone, chlorethylenes, the chlor-methanes, or any one of the common organic solvents. The solution of the total alkaloidal bases in the organic solvent is concentrated in vacuo with or without the aid of a slight amount of heat. The amount of concentration necessary depends of course upon the particular organic solvent used, and the acid employed to convert the free bases to their corresponding salts. An acid is then added, such as sulphuric, hydrochloric, or phosphoric acid, to convert the alkaloidal bases to their corresponding salts. This causes a substantially complete precipitation of all alkaloids except Ergostetrine, the latter alkaloidal salts remaining in solution because of its greater solubility in all organic solvents.

After removal of the other alkaloids by filtration, Ergostetrine is obtained in amorphous, impure form from the clear filtrate by evaporating to dryness in vacuo. By leaching the residue with small portions of water and filtering, until approximately 100 CC of the aqueous solution of Ergostetrine sulphate is obtained, the Ergostetrine can then be obtained as the dry amorphous base by (a) precipitating the base from the aqueous solution by partial saturation with sodium bicarbonate, collecting the Ergostetrine base on a filter and drying to constant weight in vacuo over a suitable dehydrating agent; or (b) by slightly alkalinizing the aqueous solution of Ergostetrine sulphate and shaking out with several small portions of ether or other immiscible organic solvent. The Ergostetrine base passes into the layer of immiscible solvent, and can be obtained as the dry substance by removal of the volatile solvent in vacuo, or (c) by obtaining the total alkaloids in ethereal solution by direct alkaline extraction of ergot or its aqueous extract, removing the ether in vacuo and drying, and redissolving the total alkaloids in the smallest necessary amount of acetone, adding water to the acetone which causes all other alkaloids to precipitate. After discarding the precipitate the amorphous Ergostetrine base is obtained by removal of the solvent.

From crude ergot extracts

Crude aqueous or hydro-alcoholic extracts (liquid, semi-solid or solid) prepared by simple procedures such as described by the U. S. Pharmacopoeia, the British Pharmacopoeia or the National Formulary can serve as a convenient starting point for the preparation of Ergostetrine.

An amount of such extracts representing 1 kilogram of original ergot, is preferably de-alcoholized in the conventional manner, alkalinized to litmus by the addition of any one of the alkalies above mentioned, and exhaustively shaken out with immiscible solvent such as ether, benzol, chloroform etc. The total alkaloids pass into the layer of the immiscible solvent. From this point the Ergostetrine can be obtained as the base or its corresponding salts as above indicated.

It is understood that the Ergostetrine so obtained may be further purified as desired by conventional alkaloidal purification procedures, such as repeating the steps above mentioned.

What is claimed is:

1. A process for obtaining a hitherto unknown component of ergot, consisting of mixing a predetermined quantity of powdered ergot with aqueous solution of alkali, extracting the dampened and alkaline drug with an organic solvent, and then concentrating and reducing the volume of the solution of the total alkaloidal bases in the organic solvent, adding an acid of the group consisting of sulphuric, hydrochloric and phosphoric acids, causing the conversion of the total alkaloids to their corresponding sulphates, hydrochlorides or phosphates and resulting in a substantially complete precipitation of all the alkaloids except the desired component.

2. A process for obtaining a hitherto unknown component of ergot, consisting of mixing a predetermined quantity of powdered ergot with an aqueous solution of alkali, exhaustively extracting the dampened and alkaline drug with an organic solvent, concentrating the solution of the total alkaloidal bases in vacuo and reducing the volume, adding an acid of the group consisting of sulphuric, hydrochloric and phosphoric acids, causing the conversion of the total alkaloids to their corresponding sulphates, hydrochlorides or phosphates and resulting in a substantially complete precipitation of all the alkaloids except the desired component, removing said alkaloids by filtration, and then obtaining an aqueous solution of the component salt from the clear filtrate by evaporating to dryness in vacuo, and leaching the residue with small portions of water.

3. A process for obtaining a hitherto unknown component of ergot, consisting of mixing a predetermined quantity of de-fatted powdered ergot with an aqueous solution of alkali, exhaustively extracting the dampened and alkaline drug with an organic solvent, then concentrating the solution of the total alkaloidal bases in vacuo and reducing the volume, adding an acid of the group consisting of sulphuric, hydrochloric and phosphoric acids, causing the conversion of the total alkaloids to their corresponding sulphates, hydrochlorides or phosphates and resulting in a substantially complete precipitation of all the alkaloids except the desired component, removing said alkaloids by filtration, then evaporating the filtrate to dryness in vacuo and leaching the residue with small portions of water to obtain an aqueous solution of the component salt, precipitating the base of the component from the aqueous sulphate solution by alkalinizing to litmus with alkaline substances, collecting the base of the component on a filter, and drying to constant weight in vacuo over a dehydrating agent.

4. A process for obtaining a hitherto unknown component of ergot, consisting of mixing a predetermined quantity of de-fatted powdered ergot with an aqueous solution of alkali, exhaustively extracting the dampened and alkaline drug with an organic solvent, then concentrating the solution of the total alkaloidal bases in vacuo, and reducing the volume, adding an acid of the group consisting of sulphuric, hydrochloric and phosphoric acids, causing the conversion of the total alkaloids to their corresponding sulphates, hydrochlorides or phosphates and resulting in a substantially complete precipitation of all the alkaloids except the desired component, removing said alkaloids by filtration, then evaporating the filtrate to dryness in vacuo and leaching the residue with small portions of water to obtain an aqueous solution of the component salt, then obtaining the component as a dry amorphous base by slightly alkalinizing the component salt solution and shaking out with several small portions of immiscible organic solvents, and final removal of the volatile solvent in vacuo.

MARVIN R. THOMPSON.